United States Patent [19]
Said et al.

[11] Patent Number: 6,002,721
[45] Date of Patent: Dec. 14, 1999

[54] CARRIER FREQUENCY ESTIMATOR FOR A SIGNAL RECEIVER

[75] Inventors: Ahmed M. Said, Fremont; Herbert W. Huang, Menlo Park, both of Calif.

[73] Assignee: Stanford Telecommunications, Inc., Sunnyvale, Calif.

[21] Appl. No.: 09/119,479

[22] Filed: Jul. 20, 1998

[51] Int. Cl.⁶ .............................. H04L 5/12; H04L 23/02
[52] U.S. Cl. .......................... 375/261; 375/326; 329/304
[58] Field of Search .................................. 375/261, 264, 375/326, 344, 327, 371; 329/304

[56] References Cited

U.S. PATENT DOCUMENTS

| | | | |
|---|---|---|---|
| 4,608,703 | 8/1986 | Kaga et al. | 375/365 |
| 4,847,864 | 7/1989 | Cupo | 375/232 |
| 4,866,395 | 9/1989 | Hostetter | 329/309 |
| 4,961,206 | 10/1990 | Tomlinson et al. | 375/261 |
| 5,315,619 | 5/1994 | Bhat | 375/340 |

*Primary Examiner*—Don N. Vo
*Attorney, Agent, or Firm*—David R. Gildea

[57] ABSTRACT

A method and apparatus for estimating a carrier frequency of an incoming signal. The carrier frequency estimator determines the phase difference between the phases for two successive modulation symbols when the two successive modulation symbols are within a particular magnitude range having at least two evenly spaced modulation phase states. The carrier frequency estimator includes a magnitude selector for selecting modulation symbols within the particular magnitude range and a phase subtractor coupled to the magnitude selector for determining phase differences between the successive modulation symbol phases. A signal receiver of the present invention uses the phase differences for tuning a locally generated frequency for tracking a carrier frequency of an incoming radio frequency (RF) signal.

20 Claims, 3 Drawing Sheets

CARRIER FREQUENCY ESTIMATOR FOR A SIGNAL RECEIVER

BACKGROUND OF THE INVENTION

1. Field of the Invention

The invention relates generally to carrier frequency recovery systems and more particularly to a carrier frequency estimator for estimating the carrier frequency of a QAM signal.

2. Description of the Prior Art

Modern communication signals carry information in the form of modulation symbols, where each of the modulation symbols represents a state for one or more bits of data. Each modulation symbol state has a particular in-phase (I) amplitude and a particular quadrature phase (Q) amplitude. When observed in a quadrature IQ plane, the I amplitudes and the Q amplitudes of the modulation symbols form a pattern or format. Many IQ formats have been used and proposed including formats termed 16 quadrature amplitude modulation (QAM), 64 QAM, 256 QAM, 1024 QAM, and the like.

FIG. 1 is an IQ diagram of the modulation symbol states for the 16 QAM format. The IQ diagram has an I axis and a Q axis. The 16 QAM format has sixteen modulation symbol states having relative I component amplitudes of −3, −1, 1, and 3 and relative Q component amplitudes of 3, 1, −1, and −3. Each modulation symbol state has a total amplitude or magnitude that is a square root of the sum of the squares of its I component amplitude and its Q component amplitude; and a phase that is an arc tangent of its I component amplitude divided by its Q component amplitude. A signal receiver uses locally generated signals for tracking (recovering) the carrier frequency and phase of an incoming communication signal in order to demodulate and decode the modulation symbols into data bits. When the locally generated frequencies do not match or have a frequency offset from the incoming frequency, the IQ diagram of FIG. 1 rotates at the rate of the frequency offset. This rotation causes the modulation symbols to change phase but not magnitude. A similar IQ diagram may be drawn for any format using modulation symbol states that can be described in terms of an I amplitude level and a Q amplitude level.

Quadrature amplitude modulation formats such as 16 QAM and the like have the benefits of being relatively easy to generate at the transmitting end of a communication signal link and relatively easy to decode into data bits at the receiving end. However, the circuitry for recovering the carrier frequency and phase is relatively complex and expensive because the communications signals for such formats do not have significant energy at the carrier frequency and therefore traditional simple phase lock loops are of no use. Typically, the complexity and expense increase where there is a relatively large frequency ambiguity over which a carrier recovery phase lock loop system is required to operate. Many specialized carrier recovery systems have been developed or proposed. However, all such systems have limitations and so there continues to be a need for improvement.

SUMMARY OF THE INVENTION

It is therefore an object of the present invention to provide a frequency estimator for estimating a carrier frequency in order to reduce the frequency range for operation of a carrier recovery phase lock loop.

FIG. 1 shows an IQ diagram of the modulation symbols of a 16 QAM format for an exemplary input signal for a carrier frequency estimator of the present invention. In the 16 QAM format, four modulation symbol states having the largest magnitude are within a magnitude range D, eight modulation symbols having an intermediate magnitude are within a magnitude range C, and four modulation symbols having the smallest magnitude are within a magnitude range B. A magnitude range A is smaller than the magnitude of any of the modulation symbols for the 16 QAM format. Briefly, the present invention determines the phase difference between the phases for two successive modulation symbols when the two successive modulation symbols are both within the magnitude range D. The phase difference is then divided by the time between the two successive modulation symbols for determining a frequency offset for estimating the carrier frequency of an incoming signal.

In a preferred embodiment the carrier frequency estimator of the present invention receives an input signal having modulation symbols having at least two symbol magnitudes and at least two evenly spaced symbol phases at a particular one of the symbol magnitudes. An example of a pattern of such modulation symbols is illustrated in the FIG. 1 and described above. The carrier frequency estimator includes a magnitude selector for detecting when two successive modulation symbols have the particular symbol magnitude and a phase subtractor coupled to the magnitude selector for determining the difference between modulation symbol phases for the two successive modulation symbols. A signal receiver of the present invention uses the phase differences for tuning a locally generated frequency for tracking a carrier frequency of an incoming radio frequency (RF) signal.

An advantage of a carrier frequency estimator of the present invention is that phase differences are available for reducing the frequency ambiguity of a carrier frequency, thereby reducing the required frequency range of operation of a carrier phase recovery system.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
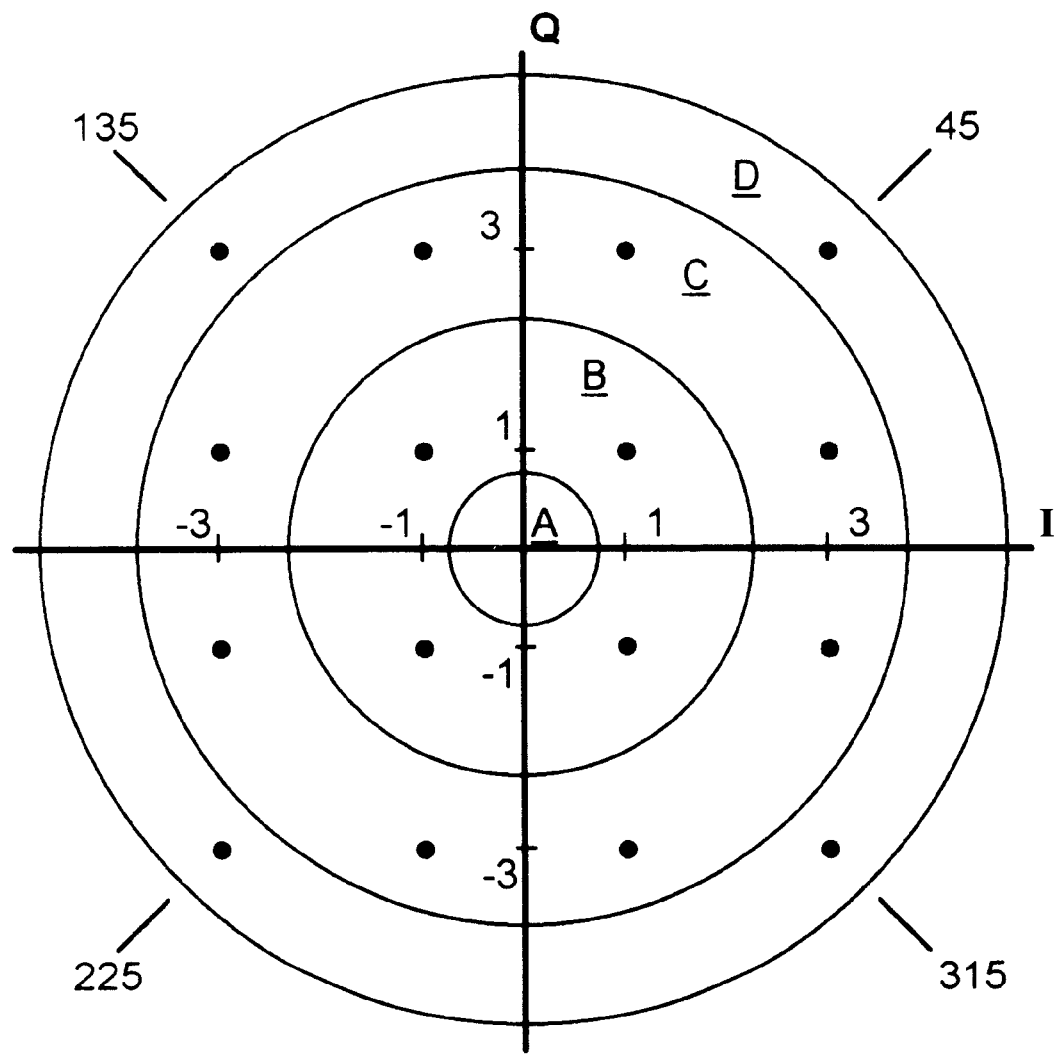
FIG. 1 is an IQ diagram of an exemplary modulation symbol state format for an input signal received by the carrier frequency estimator of the present invention.
Figure 2:
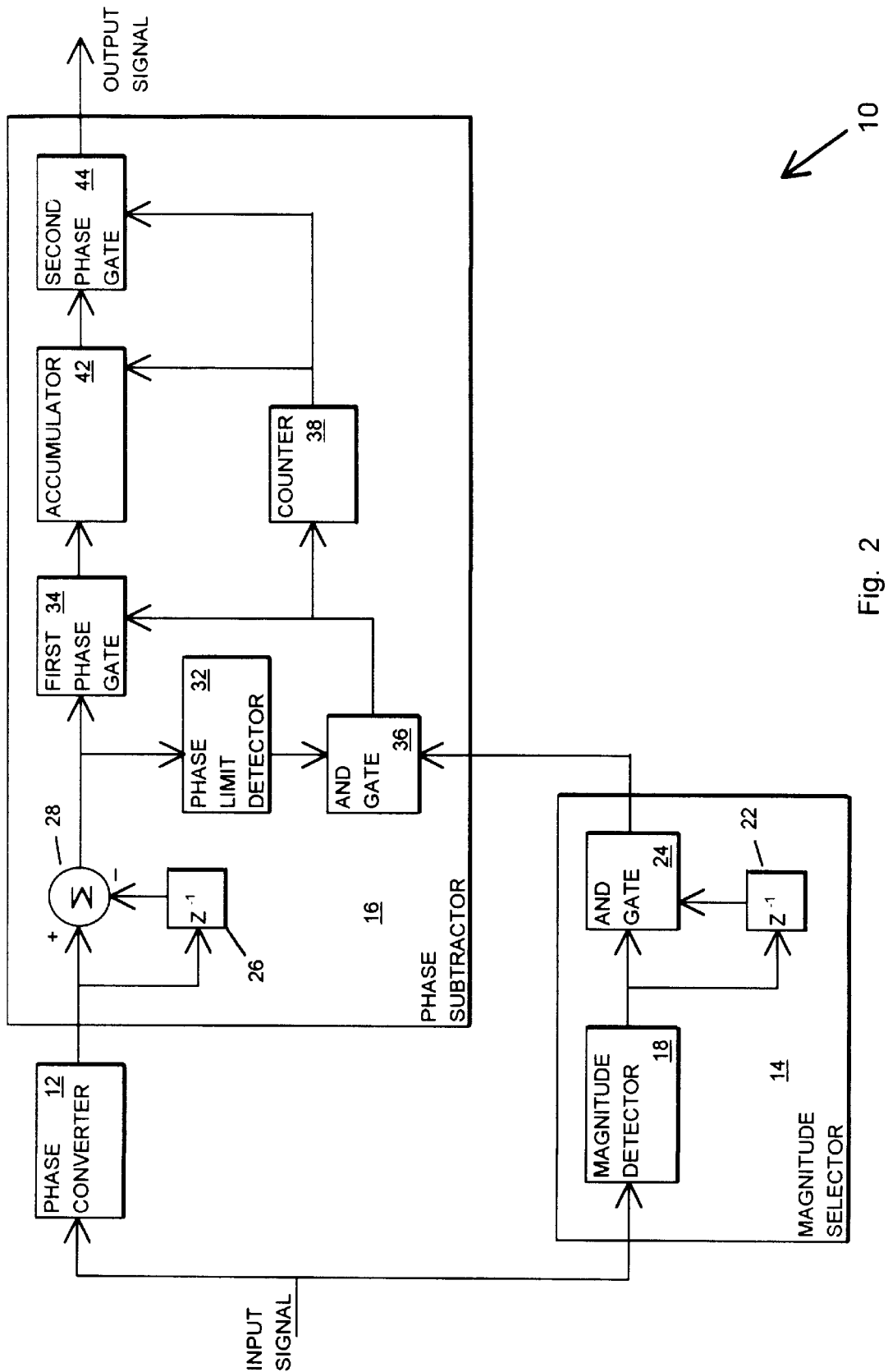
FIG. 2 is a block diagram of the carrier frequency estimator of the present invention.

FIG. 2 is a block diagram of a carrier frequency estimator of the present invention and referred to by the reference number 10. The carrier frequency estimator 10 includes a phase converter 12 and a magnitude selector 14 for receiving a digital input signal having modulation symbols having at least two symbol magnitudes and at least two approximately evenly spaced symbol phases at a particular one of the symbol magnitudes. An example of such modulation symbols is illustrated in FIG. 1 for 16 QAM and described above. In 16 QAM there are four evenly spaced phases within the magnitude range D (FIG. 1). Preferably, the digital input signal is in the form of parallel multi-level digital I and Q component signals. The phase converter 12 converts the I and Q component signals into a phase signal having a level proportional to the arc tangent of the ratio of the amplitude of the I signal component divided by the amplitude of the Q signal component and passes the phase signal to a phase subtractor 16. Such phase converter 12 may be implemented with trigonometric lookup tables.

The magnitude selector 14 includes a magnitude detector 18 for determining the magnitude of the input signal and issuing a magnitude range signal when the magnitude of a present modulation symbol is within threshold boundaries for the magnitude range D (FIG. 1) to a delay circuit 22 and a first input of an AND gate 24. The delay circuit 22 delays the magnitude range signal by one modulation symbol time period and passes the delayed magnitude range signal to a second input of the AND gate 24. The AND gate 24 issues a magnitude detection signal to the phase subtractor 16 when both the magnitude range signal and the delayed magnitude range signal indicate that the two successive modulation symbols each have the magnitude range D (FIG. 1).

The phase subtractor 16 receives the phase signal in a delay circuit 26 and a first input of a summer 28. The delay circuit 26 delays the phase signal by one modulation symbol time period and passes the delayed phase signal to a second input of the summer 28. The summer 28 takes a difference between the phase signal and the delayed phase signal and issues a phase difference signal to a phase limit detector 32 and a first input of a first phase gate 34. Preferably, the summer 28 operates with a modulo 2 $\pi$/N radians (N equals four for 16 QAM) for providing a phase difference signal corresponding to a phase difference range between ±$\pi$/N radians. It should be noted that the summer 28 may be operated with a modulo of 2 $\pi$M/N where M is an integer in the range of one to N for providing a phase difference range of ±$\pi$M/N. The phase limit detector 32 issues a phase detection signal to a first input of an AND gate 36 when the phase difference is less than a threshold boundary. The threshold boundary is selected up to a maximum of ±$\pi$/N radians depending upon the maximum frequency offset (rate of rotation) that is expected. For proper operation of the carrier frequency estimator 10, the frequency offset of the carrier frequency cannot be so great that the modulation symbols rotate by more than ±$\pi$/N radians within one symbol period. A second input of the AND gate 36 is connected for receiving the magnitude detection signal from the magnitude selector 14.

The AND gate 36 issues a first gate signal to a counter 38 and to a gating input of the first phase gate 34 when both the phase detection signal and the magnitude detection signal are simultaneously received. The first phase gate 34 uses the first gate signal for passing the phase difference signal to a first input of an accumulator 42. The accumulator 42 sequentially adds the level of each phase difference signal to the level of the previous phase difference signals and passes an accumulated phase difference signal to a first input of a second phase gate 44. The counter 38 counts the first gate signals and issues a second gate signal to a gating input of the accumulator 42 and a gating input of a second phase gate 44 when a pre-determined count threshold is reached. The second gate signal resets the accumulator 42 and causes the second phase gate 44 to issue the accumulated phase difference signal as the output signal. Information for the level of the accumulated phase difference signal and the count threshold is used for tracking, recovering, or providing an estimate of the carrier frequency of an incoming signal. Preferably, the elements of the carrier frequency estimator 10 are implemented in digital hardware and clocked by a symbol clock signal at a rate that is approximately equal to the symbol rate of the modulation symbols. The digital hardware can be designed a several ways including CMOS circuitry using a gate array or standard cell design and manufactured in any one of several commercial foundries such as Lucent Technologies, Inc. of Murray Hill, N.J., or VLSI Technology, Inc. of San Jose, Calif.

In a preferred embodiment the magnitude selector 14 and the phase subtractor 16 operate upon successive modulation symbols that are consecutive. However, it is within the scope of the present invention to operate upon modulation symbols that are separated by one or more modulation symbol periods. For example, where the rate of rotation is not expected to be greater than ±$\pi$/N radians within two symbol time periods, the delay circuits 22 and 26 may be constructed to delay by two symbol time periods and the same level of the accumulated phase difference signal would correspond to one-half of the rate of rotation as compared to delays of one symbol time period.

Figure 3:
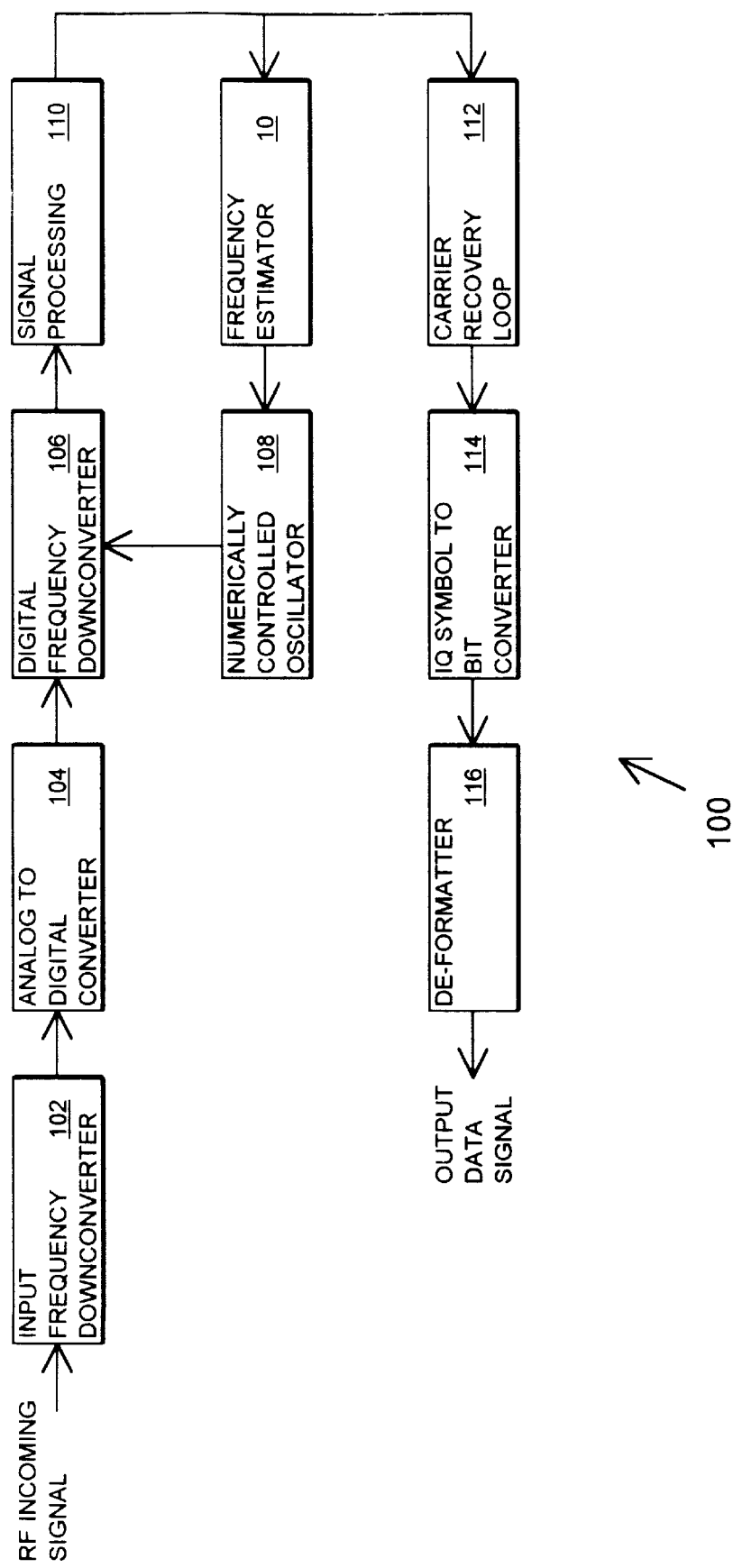
FIG. 3 is a block diagram of the signal receiver of the present invention having the carrier frequency estimator of FIG. 2.

FIG. 3 is a block diagram of a signal receiver of the present invention and referred to by the reference number 100 for receiving a radio frequency (RF) incoming signal having data bits encoded as modulation symbols, exemplified by the IQ diagram of FIG. 1 described above, and modulated onto an RF carrier signal. The signal receiver 100 includes an input frequency converter 102 including a local oscillator system for converting a radio frequency (RF) incoming signal having multiple channel frequencies to an intermediate frequency (IF) signal having a fixed IF frequency. The IF signal is converted by a digital-to-analog converter 104 to digital multi-level in-phase (I) and quadrature phase (Q) component signals. The I and Q signals are received by a digital frequency downconverter 106. The digital frequency downconverter 106 uses a digital local oscillator signal from a numerically controlled oscillator 108 for downconverting the I and Q signals and passing the downconverted I and Q signals to a signal processor 110.

The signal processor 110 processes the downconverted I and Q signals by filtering with a matched filter, recovering a symbol clock, and equalizing. The I and Q signals are then issued to the carrier frequency estimator 10 and a carrier recovery loop 112. Such processed I and Q signals may be visualized according to FIG. 1 where a rotation of the pattern of modulation symbols corresponds to a frequency offset between the RF carrier frequency of the RF incoming signal and the combination of the locally-generated frequency or frequencies used for frequency conversion in the input frequency converter 102 and the digital local oscillator frequency provided by the numerically controlled oscillator 108. The carrier frequency estimator 10 receives the processed I and Q signals as its input signal and issues the accumulated phase difference signal as its output signal, as described above. The numerically controlled oscillator 108 uses the accumulated phase difference signal for adjusting the frequency of the digital local oscillator signal in order to substantially reduce or eliminate the rotation of the modulation symbols in the processed I and Q signals, thereby substantially reducing the frequency range that is required for operation of the carrier recover loop 112.

The carrier recovery loop 112 includes a decision-type phase lock loop for phase locking to the processed I and Q signals and providing de-rotated I and Q signals to an IQ symbol to bit converter 114. The IQ symbol to bit converter 114 converts the modulation symbols for the de-rotated I and Q signals into raw data bits. A de-formatter 116 de-scrambles, decrypts, forward error corrects, and de-frames the raw data bits according to a pre-determined data format and issues an output data signal for the information that is carried in the RF incoming signal.

Referring back to FIG. 1, it should be understood that the present invention is not limited to use of the magnitude range D. For example, the magnitude range B could be used in place of or in addition to the magnitude range D while still retaining N equal to four evenly spaced modulation symbol phases. Further, the present invention is not limited to a 16 QAM modulation format. For example, equivalent magnitude threshold boundaries for a 64 QAM format, a 256 QAM format, and the like may be constructed. And further, the modulation format need not be square but may have any arbitrary shape where at least two modulation symbols within a selected magnitude range have an equal phase spacing.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of estimating a carrier frequency of an incoming modulated signal having modulation symbols having at least two modulation symbol magnitudes and at least two approximately evenly spaced modulation symbol phases at a particular one of said symbol magnitudes, comprising steps of:

detecting when two successive said modulation symbols have said particular symbol magnitude; and determining a phase difference between modulation symbol phases for said two successive modulation symbols.

2. The method of claim 1, wherein:

the step of determining said phase difference includes accumulating said phase difference for two or more sets of said two successive modulation symbols.

3. The method of claim 1, wherein:

the step of determining said phase difference includes subtracting one of said modulation symbol phases from the other of said modulation symbol phases for said two successive modulation symbols with a modulo $2\pi/N$ where said N is the number of said approximately evenly spaced modulation symbol phases having said particular symbol magnitude.

4. The method of claim 1, further comprising steps of:

receiving an IQ signal representative of said incoming modulated signal, said IQ signal having an in-phase (I) component signal and a quadrature phase (Q) component signal;

converting said IQ signal to a phase signal having successive levels proportional to said modulation symbol phases; and using said phase signal in the step of determining said phase difference for said successive modulation symbols.

5. The method of claim 4, further comprising a step of:

using said phase difference for reducing a rate of rotation of said modulation symbols in said IQ signal.

6. The method of claim 1, wherein:

said particular symbol magnitude is a magnitude of said modulation symbols having a largest magnitude of said modulation symbols.

7. The method of claim 1, wherein:

said incoming modulated signal is a quadrature amplitude modulation (QAM) signal having at least 16 states for said modulation symbols.

8. The method of claim 1, wherein:

said incoming modulated signal includes modulation symbols having said particular symbol magnitude having four said approximately evenly spaced modulation symbol phases.

9. The method of claim 1, further comprising steps of:

receiving a first IQ signal representative of said incoming modulated signal, said first IQ signal having a rate of rotation of said modulation symbols;

adjusting a local frequency according to said phase difference; and using said local frequency for frequency converting said first IQ signal to a second IQ signal having a substantial reduction of said rate of rotation; and wherein:

the steps of detecting when two successive said modulation symbols have said particular symbol magnitude and determining a phase difference between modulation symbol phases for said two successive modulation symbols are performed on said second IQ signal.

10. The method of claim 9, further comprising steps of:

using said second IQ signal for recovering a carrier phase of said incoming modulated signal.

11. A carrier frequency estimator for estimating a carrier frequency of an incoming modulated signal having modulation symbols having at least two modulation symbol magnitudes and at least two approximately evenly spaced modulation symbol phases at a particular one of said symbol magnitudes, comprising:

a magnitude selector for detecting when two successive said modulation symbols have said particular symbol magnitude; and a phase subtractor coupled to the magnitude selector for determining a phase difference between modulation symbol phases for said two successive modulation symbols.

12. The estimator of claim 11, wherein:

the phase subtractor is further for accumulating said phase difference for two or more sets of said two successive modulation symbols.

13. The estimator of claim 11, wherein:

the phase subtractor is further for subtracting one of said modulation symbol phases from the other of said modulation symbol phases for said two successive modulation symbols with a modulo $2\pi/N$ where said N is the number of said approximately evenly spaced modulation symbol phases having said particular symbol magnitude.

14. The estimator of claim 11, further comprising:

a phase converter for receiving an IQ signal representative of said incoming modulated signal, said IQ signal having an in-phase (I) component signal and a quadrature phase (Q) component signal, and converting said IQ signal to a phase signal having successive levels proportional to said modulation symbol phases for said successive modulation symbols; and wherein:

the phase subtractor is for using said phase signal for determining said phase difference.

15. The estimator of claim 14, wherein:

said phase difference for use for reducing a rate of rotation of said modulation symbols in said IQ signal.

16. The estimator of claim 11, wherein:
said particular symbol magnitude is a magnitude of said modulation symbols having a largest magnitude of said modulation symbols.

17. The estimator of claim 11, wherein:
said incoming modulated signal is a quadrature amplitude modulation (QAM) signal having at least 16 states for said modulation symbols.

18. The estimator of claim 11, wherein:
said incoming modulated signal includes modulation symbols having said particular symbol magnitude having four said approximately evenly spaced modulation symbol phases.

19. A signal receiver for receiving an incoming modulated signal having modulation symbols having at least two modulation symbol magnitudes and at least two approximately evenly spaced modulation symbol phases at a particular one of said symbol magnitudes, comprising:

a frequency converter for using a local frequency for frequency converting a first IQ signal to a second IQ signal, said first IQ signal representative of said incoming modulated signal;

a local oscillator for receiving a phase difference and adjusting said local frequency according to said phase difference for reducing a rate of rotation of said modulation symbols in said second IQ signal as compared to said first IQ signal; and a carrier frequency estimator including a magnitude selector for receiving said second IQ signal and detecting when two successive said modulation symbols have said particular symbol magnitude and a phase subtractor for receiving said second IQ signal and coupled to said magnitude selector for determining said phase difference for a difference between modulation symbol phases for said two successive modulation symbols.

20. The receiver of claim 19, further comprising:
a carrier phase recovery loop for using said second IQ signal for recovering a carrier phase of said incoming modulated signal.

* * * * *